April 27, 1948. J. G. FRANCIS 2,440,332
AUTOMATIC FEEDING APPLIANCE FOR POULTRY, PIGEONS, AND OTHER BIRDS
Filed Oct. 3, 1942 2 Sheets-Sheet 1
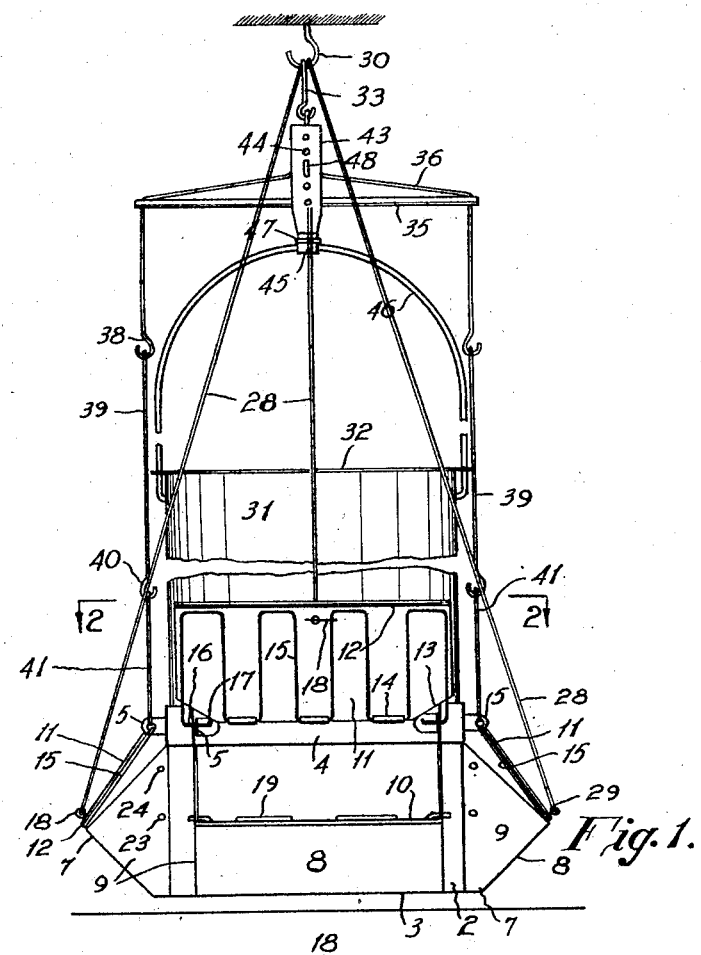
Fig. 1.
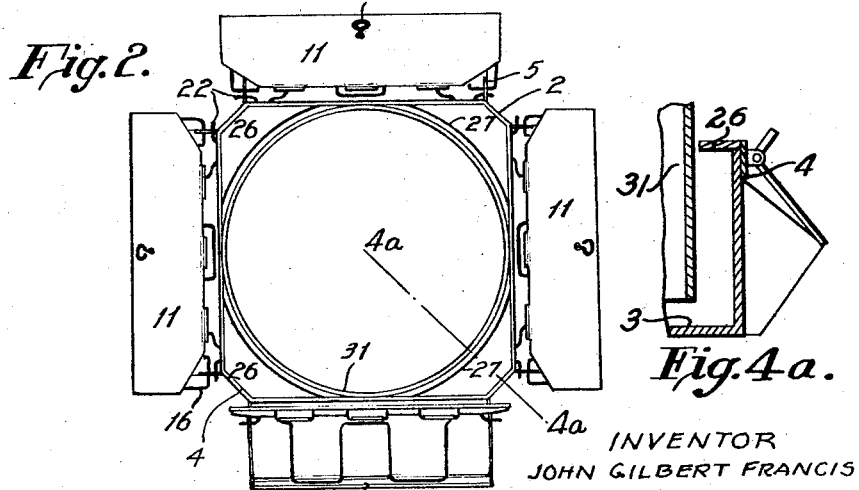
Fig. 2.
Fig. 4a.
INVENTOR
JOHN GILBERT FRANCIS
BY Oberlin, Limbach & Day
ATTORNEYS

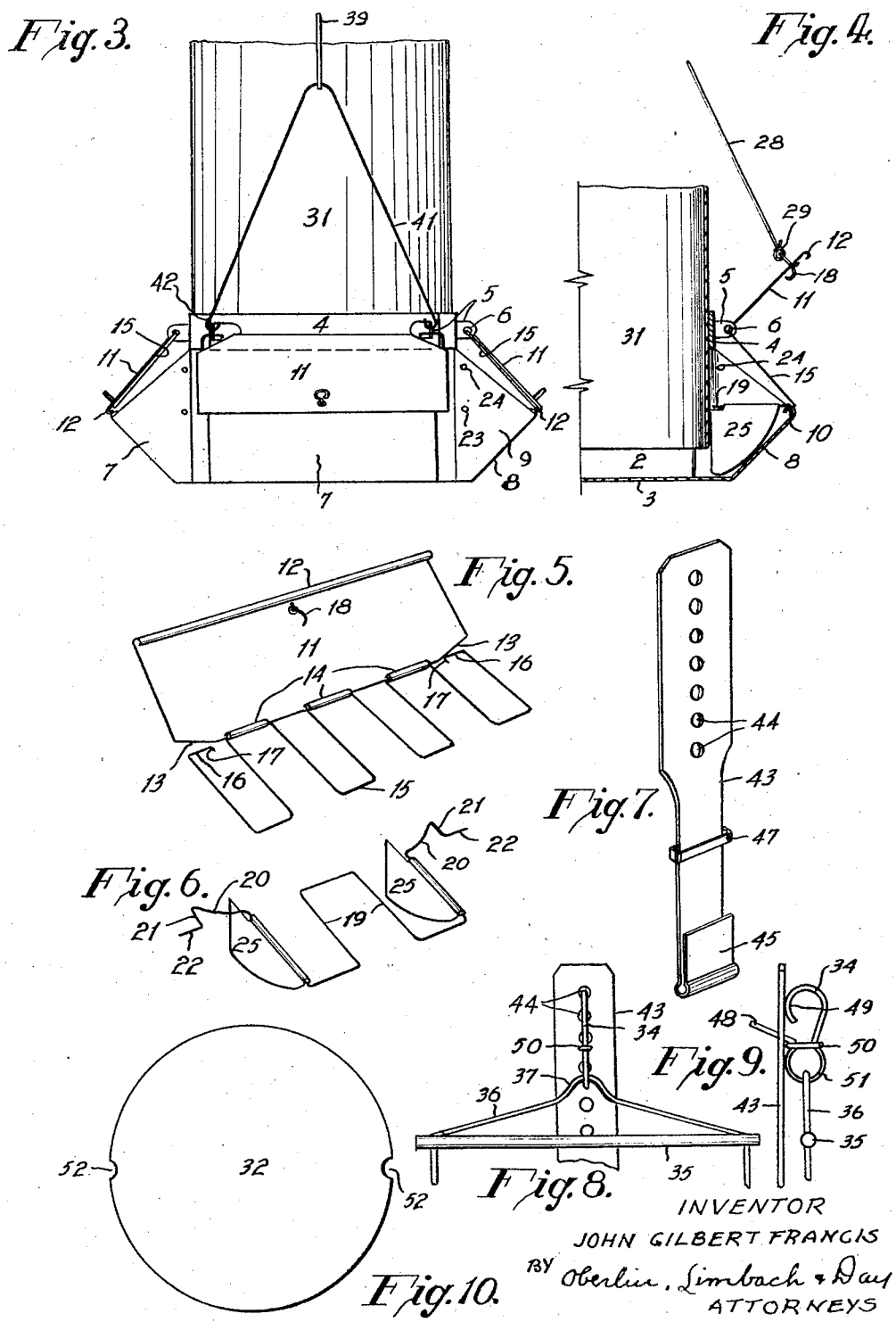

Patented Apr. 27, 1948

2,440,332

UNITED STATES PATENT OFFICE 2,440,332

AUTOMATIC FEEDING APPLIANCE FOR POULTRY, PIGEONS, AND OTHER BIRDS

John Gilbert Francis, Heidelberg, near Melbourne, Victoria, Australia

Application October 3, 1942, Serial No. 460,646
In Australia October 15, 1941

7 Claims. (Cl. 119—53)

This invention relates to an improved automatic feeder principally for poultry, but adaptable also as a feeder for pigeons and aviary birds.

The principal object for which the invention has been devised is to provide an automatic feeder of durable, economical and sanitary construction, which requires but a minimum of attention and in its principal form will be found to be particularly efficient for the feeding of poultry in all three stages of their development, that is to say, chickens, half-grown birds, and fully-grown birds, without waste of food.

A further object is to provide an automatic feeder for poultry having means for the storage of a relatively large quantity of food in clean wholesome condition and the maintenance of the same free from ravages by rodents, sparrows and other pests; means which are adjustable and readily controlled for automatically delivering regulated quantities of the stored food to a series of feeding troughs so as to be readily accessible to the poultry; and interchangeable grids for the troughs, apportioning each of the same into a series of feeding compartments, suitable for feeding poultry in their different developmental stages.

The improved appliance comprises a hopper casing with base of square or rectangular configuration having feed troughs extending outwardly from its four sides, means for suspending the hopper, grids which apportion each of the troughs into a series of compartments suitable for feeding birds at different stages of their developmental growth, closure shutters for the troughs, a bottomless food-containing cylinder fitted suspensorily within the hopper casing, and means for regulating the distance between the food container and the floor of the hopper casing whereby the amount of food gravitationally delivered to the feed troughs is controlled.

The invention consists of an automatic feeder for poultry and other birds having the features of construction, combination and arrangement hereinafter described aided by reference to the accompanying explanatory drawings wherein:

Fig. 1 is a front elevation of the improved appliance suspended a slight distance above ground level with the shutter of one feed trough in its elevated open position and the shutters of the remaining three feed troughs in lowered closed positions.

Fig. 2 is a sectional plan taken on the line 2—2 in Fig. 1, parts being omitted.

Fig. 3 is a side elevation of the lower end portion of the appliance with its feed troughs closed by the lowered shutters.

Fig. 4 is a fragmentary vertical central sectional view of the lower end portion of the appliance, illustrating the hopper casing and trough constructions, relative positions of grids and troughs, and means for actuating the trough shutters.

Fig. 4a is similarly a fragmentary vertical section taken at the corner of the lower end of the appliance on a plane radial to the center, i. e. line IVa, Fig. 2.

Fig. 5 is a perspective view of one of the trough shutters having pivotally attached thereto a grid which is used in the feeding of chickens from a trough.

Fig. 6 is a perspective view of a grid having end baffles, the same being attached to a feed trough for the feeding of fully grown birds.

Fig. 7 is a detail view of a calibrating plate which is provided for the suspension of the food-containing cylinder.

Figs. 8 and 9 are detail views in front elevation and side elevation, respectively, of devices provided for the suspension of the hopper casing and the food-containing cylinder.

Fig. 10 is a plan view of one design of detachable lid for the upper end of the food-containing cylinder.

The automatic feeder illustrated in these views comprises a horizontal hopper casing 2 of generally square or somewhat octagonal shape in cross-section. This hopper casing has a flat bottom 3 and a strong metal band 4 which is rigidly secured to and extends around its upper end portion. Lugs 5 are expressed from the metal band 4 at its four corner portions and holes 6 are punched in said lugs. The purposes served by these apertured lugs will be hereinafter explained.

Projecting outwardly from the sides of the hopper casing 2 at corresponding locations are four feed troughs 7. Each trough has a front wall 8 sloping inwardly to the flat bottom 3 of the hopper casing and opposite end walls 9 which are of substantially V-shape and approximately double the height of the front wall. The upper end portion of the front wall is curled inwardly as indicated by 10, see Fig. 4, to eliminate sharp edges and also to provide a curved baffle to prevent waste of grain or other food that is outwardly dispersed by poultry during feeding times.

Each of the feed troughs has a hingedly mounted gravitationally acting shutter 11 consisting of a flat strip of sheet metal which is beaded at its lower edge 12 to impart to it necessary weight and strength. The shutter at its upper end is cut away at its opposite corners 13, and it is curled along its upper edge at 14 to encircle the upper horizontal members of a wire grid 15 thereby providing a pivotal connection between the grid and shutter.

The wire grids 15 are employed for the feeding of chickens and when they are hingedly lowered over the troughs 7 they apportion each of said troughs into a series of compartments dimensioned to permit chickens projecting their heads and neck portions into the troughs and having necessary freedom of movement for feeding, while preventing the chickens from entering bodily into the troughs.

The end portions of the wire from which each of said grids is shaped are inwardly bent to form hinge pintles 16 that are sprung through the holes 6 of the lugs 5 whereby the grid is hingedly connected to the hopper casing 2. The ends of the wire are further bent at 17 to provide stops which abut against the inner faces of said lugs and thus prevent the grid from being inadvertently sprung outwardly and accidentally detached from said lugs.

Each shutter has at its lower end a turn catch 18 for engagement with a lower branch of the grid 15 in order that the grid and shutter can be locked together as is seen in Fig. 1, when they can be hingedly raised and lowered as a unit on the pintles 16, while also providing means whereby the shutter can be readily released from the grid and the grid set obliquely over the relative feed trough with its free end resting on top of the trough wall 8 as seen in Fig. 4. The shutter can then be raised and lowered on the pivots 14 independently of the grid. The oblique setting of the grids eliminates danger of chickens passing to and fro across said grids and fouling the food contents of the troughs 7.

Additional wire grids as 19, see Fig. 6, are provided for detachable connection to the hopper casing 2 about the troughs 7 and for use when feeding half-grown and fully-grown poultry, the compartments of the grids 19 being wider than those of the grids 15. The opposite end portions of the wire from which the grid 19 is formed have extension members which are curved outwardly at 20, bent downwardly at 21, and then bent outwardly to provide pintles 22 adapted to be passed through holes 23 or alternatively through higher positioned holes 24, both sets of holes being punched in the end walls 9 of a trough 7. The inherent springiness of the comparted grid enables it to be compressed by finger pressure to fit within a trough, whereupon the pintles 22 are sprung outwardly through the selected holes 23 or 24 with the members 21 of the said grid in abutment with the inner faces of the end walls of the trough whereby displacement or inadvertent detachment of the grid is prevented. These additional grids being of wider spacing than the grids 15 may, when desired, be left in position along with the latter, as indicated in Fig. 4.

In order to restrain poultry from unduly scattering or wasting food as, for example, when seeking some particular grains or desirable morsels, baffle plates 25 are provided. These baffle plates have their upper ends curled and encircle the end members of the wire grids 19. Thus the baffle plates are capable of having free swinging movement within the troughs 7 at or about the opposite ends of the same. When the pintles 22 of the wire grids have been inserted through the higher holes 24, the grids will be set obliquely over the feed troughs, but when the pintles have been placed through the lower holes 23, as more frequently is the case, the grids will lie horizontally over the troughs, their free ends being supported by the upper curled ends 10 of said troughs as illustrated in Fig. 4. The limited distance between the horizontally placed grids 19 and the hingedly elevated shutters 11 precludes even half-grown poultry from using said grids to pass to and fro across the troughs 7.

The hinged shutters provide effective closures for the feed troughs to prevent entrance of rats, mice, sparrows or other migrant birds. For the same purpose, horizontal cover plates 26 having their inner edges 27 of curved shape are riveted or otherwise rigidly secured to the stout metal band 4 which encircles the upper end portion of the hopper casing 2, see Fig. 2.

A cord 28 is attached at ring 29 to each hinged shutter. These cords extend upwardly and can be pulled to elevate the four shutters 11 to open the feed troughs 7. At the termination of feeding times, all four shutters 11 are allowed to descend gravitationally to close said troughs.

A vertically arranged cylinder 31 which is bottomless has its lower end portion freely slidable within the hopper casing 2 interiorly of the cover plates 26. This cylinder is dimensioned to hold a suitable quantity of poultry food and it constitutes the inner walls of all four feed troughs 7. The food with which the cylinder has been charged is delivered gravitationally, from time to time as it becomes needed, through the space between the lower edge of the said cylinder and the flat bottom of the hopper casing into the several feed troughs. By merely raising or lowering the cylinder relatively to the hopper casing and maintaining it at the selected relative position, the area of the feed opening communicating with each trough can be readily regulated as may be found necessary to suit particular classes of food and also to meet the feeding requirements of poultry at different stages of their development. The cylinder has a detachable lid 32 which in the simple form shown in the drawings consists of a discoid plate having diametrically opposite peripheral recesses 52, the purpose of which will be hereinafter explained. In general practice the lid 32 has a depending flange whereby it is adapted to closely fit the upper end of the cylinder, and it is preferably of conical configuration for the purpose of preventing poultry from perching thereon.

Depending from the fixed hook 30 is a hook 33 to which is connected a double hook device that is of the construction illustrated clearly in Fig. 9 and is employed for the suspension of the automatic feeder. Fitted to a spreader bar 35 is a wire 36 having a centrally positioned loop or catch 37, see Fig. 8, held swivelly by the lower hook 51 of said device. The wire 36 is bent vertically downwardly from opposite ends of the spreader bar and terminates in loops 38 to which are connected vertical wires 39 having at their lower ends hooks 40.

Detachably connected to the hooks 40 are wires 41 of inverted V-shape which extend downwardly on opposite sides of the cylinder 31 and have their extremities 42 curved inwardly to hook into the apertured lugs 5 of the metal band 4 fixed to the upper end portion of the hopper casing 2. The several sections of the articulated suspension wires can be readily disconnected and be folded together to occupy minimum space when the feeder is required to be transported.

A calibrating plate 43 having a series of vertical adjustment holes 44 with appropriate markings adjacent thereto is provided. The lower end portion of the calibrating plate is looped at 45 to provide a catch which encircles a bowed wire 46 that is fixed to the upper end of the cylinder 31 and is accommodated by the peripheral recesses 52 formed in the cylinder lid 32. Fitted slidably over the looped end of the calibrating plate is a security ring 47 to reinforce the looped members of said plate and prevent them spreading apart under strains imposed by the weight of the poultry food within the appliance.

The lower hook 51 of the double hook device has an upwardly inclined extension 48 which forms a suspension arm adapted to be passed through a selected hole of the series of holes 44 punched in the calibrating plate 43 supporting the cylinder 31. The upper hook 34 of said device has its member 49 designed to impinge against the calibrating plate to serve as a spacer whereby the suspension wires of the hopper casing 2 will be normally maintained in their correct vertical position. A ring 50 is fitted about the waist of the double hook device to reinforce the extension arm 48 and restrain the lower hook 51 from opening under strains imposed by the weight of food contained in the feeder.

For the feeding of chickens, the appliance is lowered until it rests upon the ground and the catches 18 are turned to release the grids 15 which are then swung downwardly from the apertured lugs 5 to subdivide each of the troughs 7 into a series of feeding compartments. The shutters 11 are then elevated simultaneously by a pull exerted on the master cord that is connected to the cords 28, and in this elevating movement the shutters are swung upwardly on the pivots 14. At the termination of feeding times, the shutters are lowered gravitationally to rest over said grids 15.

When the appliance is to be used for the feeding of half-grown and fully grown poultry, the grids 15 are moved pivotally upwards upon their pintles 16 until they abut against the inner faces of the shutters, whereupon they are locked in this position by manipulation of the turn catches 18. The grids 19 are now fitted to the hopper casing to subdivide each of the troughs into a series of compartments, the holes 23 or the holes 24 being selected for the pintles 22 of said grids, depending upon the desirability of having the grids positioned horizontally over the troughs or set obliquely thereover. The appliance is raised so as to be suspended a suitable distance above the ground, as is seen in Fig. 1, whereby it will swing freely about the fixed hook 30 for the automatic agitation of the food within the cylinder 31 by the poultry feeding at the troughs. The shutters 11 are elevated to open position over the troughs and lowered to closed position over said grids by manipulation of the master cord, as previously described, at the commencement and at the termination of feeding times, respectively. When it is required to regulate the area of opening between the lower edge of the cylinder 31 and the bottom of the hopper casing 2, the calibrating plate 43 from which said cylinder is suspended is detached from the arm 48 of the double hook device, and said arm is then passed through a higher or a lower positioned hole of the series 44 provided in the calibrating plate for the purpose mentioned.

An automatic feeder according to the invention may have a hopper casing 2 of a shape other than square or rectangular, in which event the number of feed troughs 7 will be varied accordingly. The grids 15 and 19 will be dimensioned to suit troughs of different dimensions, providing a greater or a lesser number of the feeding compartments for chickens, half-grown and fully grown poultry. Moreover, spare grids for use interchangeably with the grids 19 can be provided and stored on the feeder when not required for immediate use. These and other modifications of similar nature in constructional details as also in the design of integers of the appliance may be made within the ambit of the invention as is defined by the appended claims.

What I do claim is:

1. In an automatic feeder of the character described, a hopper casing, feed troughs on said casing, a bottomless food container therein, hinged grids apportioning each of said troughs into a series of feeding compartments, shutters pivotally connected to said grids, clips on said shutters for releasably holding the free ends of said grids, means for elevating and lowering said shutters to open and close said troughs, additional grids independently hinged to said troughs, and baffles associated with the latter grids to prevent small animals which are feeding from throwing feed out of the trough.

2. In an automatic feeder of the character described, a hopper casing, a bottomless feed container therein, feed troughs on said casing, grids hinged to said troughs apportioning each of them into a series of feeding compartments, shutters pivotally mounted on said grids, clips on said shutters releasably holding the free ends of said grids, other grids having relatively wide spaces and being detachably and adjustably fitted to said troughs, baffles pivoted on the latter mentioned grids, and means for elevating and lowering said shutters.

3. In an automatic feeder of the character described, a hopper casing having a plurality of feed troughs, hinged shutters for said troughs, means for raising and lowering said shutters, articulated suspension wires connected at their lower ends to said casing, a suspension device, a calibrating plate having a series of vertically spaced holes for its adjustable mounting on said suspension device, a catch on said calibrating plate, and a bottomless food-container suspended from said catch whereby its lower end portion depends within said casing.

4. In an automatic feeder of the character described, the combination set out in the preceding claim 3, wherein the troughs have two sets of independently hinged wire grids formed with comparted spaces of different widths for substitutive use, and the hinged shutters are adapted to be elevated above and gravitationally lowered onto said grids.

5. In an automatic feeder of the character described, the combination set out in the preceding claim 3, wherein the food-container has a detachable lid and a bowed wire having its ends fastened to the upper portion of said food container is suspensorily retained in the catch that is formed on the calibrating plate.

6. In an automatic feeder of the character described, the combination set out in the preceding claim 3, wherein the suspension device consists of a double hook the lower hook member of which is formed with an upwardly inclined arm adapted for the adjustable suspension thereon of the calibrating plate, and the upper hook member functions as a spacing element by impinging against said calibrating plate.

7. In an automatic feeder of the character described, a hopper casing having a plurality of feed troughs adapted for suspension, a double hook having its lower suspension member formed with an upwardly inclined arm, a calibrating plate having a series of vertically spaced holes adjustably fitted onto said inclined arm, a catch at the lower end of said calibrating plate, and a food container suspended from said catch and having its lower end portion depending within said hopper casing.

JOHN GILBERT FRANCIS.

REFERENCES CITED

The following references are of record in the file of this patent:

UNITED STATES PATENTS

| Number | Name | Date |
|---|---|---|
| 192,876 | Prather | July 11, 1877 |
| 477,139 | Mitchell et al. | June 14, 1892 |
| 574,100 | Macy | Dec. 29, 1896 |
| 714,557 | Bowmaker | Nov. 25, 1902 |
| 1,041,851 | Niemann | Oct. 22, 1912 |
| 1,106,547 | Crabill | Aug. 11, 1914 |
| 1,149,477 | Thompson | Aug. 10, 1915 |
| 1,227,524 | Bloom et al. | May 22, 1917 |
| 1,361,045 | Giesy | Dec. 7, 1920 |
| 1,469,961 | Rood | Oct. 9, 1923 |
| 1,759,352 | Hart | May 20, 1930 |
| 2,122,880 | Dost | July 5, 1938 |
| 2,221,013 | White | Nov. 12, 1940 |

FOREIGN PATENTS

| Number | Country | Date |
|---|---|---|
| 201,365 | Great Britain | Aug. 2, 1923 |
| 161,322 | Great Britain | Apr. 14, 1921 |